United States Patent
Saeki et al.

(10) Patent No.: US 8,405,357 B2
(45) Date of Patent: Mar. 26, 2013

(54) BATTERY UNIT, BATTERY SYSTEM, ELECTRONIC DEVICE, CHARGING CONTROL METHOD OF BATTERY, AND DISCHARGING CONTROL METHOD OF BATTERY

(75) Inventors: Mitsuo Saeki, Kawasaki (JP); Kouichi Matsuda, Kawasaki (JP); Akira Takeuchi, Kawasaki (JP); Hidetoshi Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 585 days.

(21) Appl. No.: 12/510,466

(22) Filed: Jul. 28, 2009

(65) Prior Publication Data

US 2010/0085014 A1 Apr. 8, 2010

(30) Foreign Application Priority Data

Oct. 3, 2008 (JP) ................. 2008-258787

(51) Int. Cl.
*H02J 7/00* (2006.01)
*G01N 27/416* (2006.01)
*H02H 7/00* (2006.01)
(52) U.S. Cl. ........ 320/134; 320/149; 320/155; 324/426; 361/8; 361/13
(58) Field of Classification Search .................. 320/134
See application file for complete search history.

(56) References Cited

U.S. PATENT DOCUMENTS

| | | | |
|---|---|---|---|
| 6,051,955 A | 4/2000 | Saeki | |
| 6,405,049 B2* | 6/2002 | Herrod et al. | 455/517 |
| 6,456,046 B1* | 9/2002 | Gaza | 320/155 |
| 2001/0022518 A1* | 9/2001 | Asakura et al. | 324/426 |
| 2005/0156566 A1 | 7/2005 | Thorsoe | |
| 2009/0045944 A1* | 2/2009 | Morgan | 340/539.11 |

FOREIGN PATENT DOCUMENTS

| | | |
|---|---|---|
| JP | 7-22009 | 1/1995 |
| JP | 10-322915 | 12/1998 |
| JP | 2000-102185 | 4/2000 |
| JP | 2004-31273 | 1/2004 |
| JP | 2005-528070 | 9/2005 |

* cited by examiner

*Primary Examiner* — Yalkew Fantu
(74) *Attorney, Agent, or Firm* — Staas & Halsey LLP

(57) ABSTRACT

A battery unit includes: a battery having cell units connected in parallel, in which one or a plurality of battery cells is connected in series; an external terminal provided for the battery; a switching element provided between each internal terminal and the external terminal of the cell unit; a protection circuit monitoring whether or not a fault occurs in each of the plurality of cell units and cutting off, through the switching element, a connection between the internal terminal and the external terminal of the cell unit with the fault detected; and an informing signal output terminal notifying an external device that the connection with the external terminal with respect to at least one of the cell units is cut off.

11 Claims, 11 Drawing Sheets

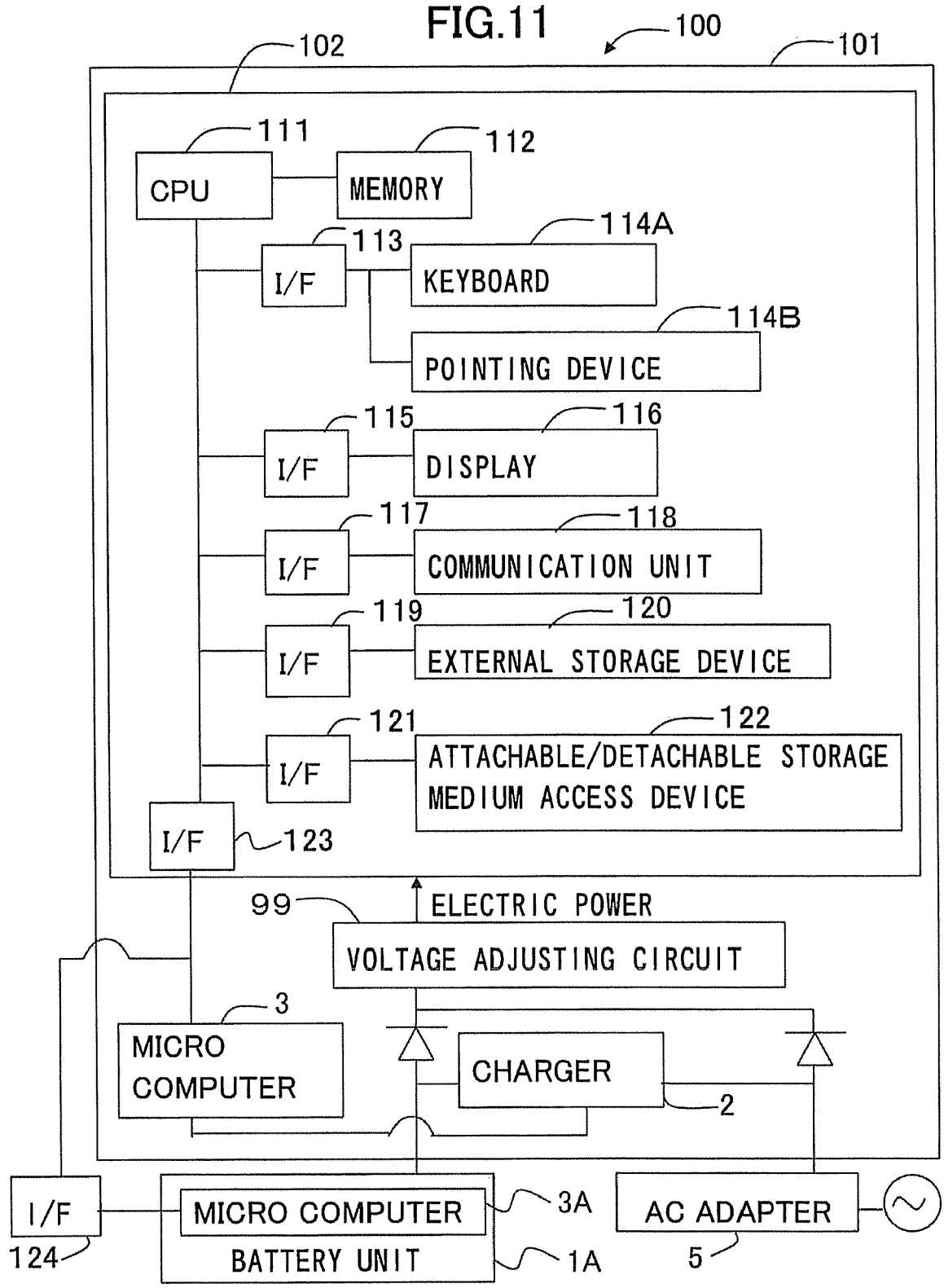

BATTERY UNIT, BATTERY SYSTEM, ELECTRONIC DEVICE, CHARGING CONTROL METHOD OF BATTERY, AND DISCHARGING CONTROL METHOD OF BATTERY

CROSS-REFERENCE TO RELATED APPLICATIONS

This application is based upon and claims the benefit of priority of the prior Japanese Patent Application No. JP2008-258787, filed on Oct. 3, 2008, the entire contents of which are incorporated herein by reference.

FIELD

The present technology relates to charging and discharging of a battery.

BACKGROUND

A battery pack is used as a power source for a portable personal computer called a laptop type or notebook type personal computer, a mobile information terminal, a mobile phone and a mobile-oriented electronic device such as a mobile-oriented music player. Many battery packs used for these electronic devices may employ a combined-cell battery, and the electronic device is mounted with a combined-cell battery pack including a combination of the single-cells. A reason why so lies in satisfying voltage or current conditions requested of these electronic devices. In this type of battery pack, it is possible to provide a battery pack having a variety of power source voltages and current capacities by arranging the cells in series or in parallel and further combining these cells.

By the way, the notebook type personal computer involves using a lithium (Li) ion secondary battery in many cases. In the case of using the lithium (Li) ion secondary battery, however, it is required that safety of the battery be sufficiently taken into consideration. Therefore, a protection circuit is mounted in the battery pack, monitors each of cell blocks and performs, when abnormality occurs in voltage, its protective function matching with this situation (refer to, e.g., Patent document 1).

This type of prior art discloses a configuration that the battery incorporates a plurality of cell units in parallel, in which a plurality of battery cells is connected in series. Then, when a voltage of any one of the cell units deviates from a predetermined range (falling into an abnormal status), this abnormal cell unit can be separated. In this case, the cell units other than the separated cell unit are possible of charging/discharging operations and can be also used continuously.

[Patent document 1] Japanese Patent Publication No. 3330517
[Patent document 2] Japanese Patent Laid-Open Publication No. H07-22009
[Patent document 3] Japanese Patent Laid-Open Publication No. 2000-102185
[Patent document 4] Japanese Unexamined Patent Publication No. 2005-528070
[Patent document 5] Japanese Patent Laid-Open Publication No. 2004-31273

SUMMARY

If the charge and discharge of the battery are conducted in a state where the cell units are partially separated, however, there is a possibility that the current flowing into the battery partially increases. Accordingly, it is desirable that the current be minutely controlled when charging and discharging corresponding to the internal status of the battery in order to further enhance the safety. The technology of the disclosure aims at further enhancing the safety of the battery by solving the conventional problems described above.

Namely, this technology can exemplify a battery unit including: a battery including cell units connected in parallel, in which one or a plurality of battery cells is connected in series; an external terminal provided for the battery; a switching element provided between each internal terminal and the external terminal of the cell unit; a protection circuit to monitor whether or not a fault occurs in each of the plurality of cell units and cutting off, through the switching element, a connection between the internal terminal and the external terminal of the cell unit with the fault detected; and an informing signal output terminal to notify an external device that the connection with the external terminal with respect to at least one of the cell units is cut off.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 11 is a diagram exemplifying a configuration of another electronic device.

DESCRIPTION OF EMBODIMENT(S)

A battery unit 1 according to an aspect of an embodiment will hereinafter be described with reference to the drawings. A configuration in the following embodiment is an exemplification, and the battery unit is not limited to the configuration in the embodiment.

Figure 1:
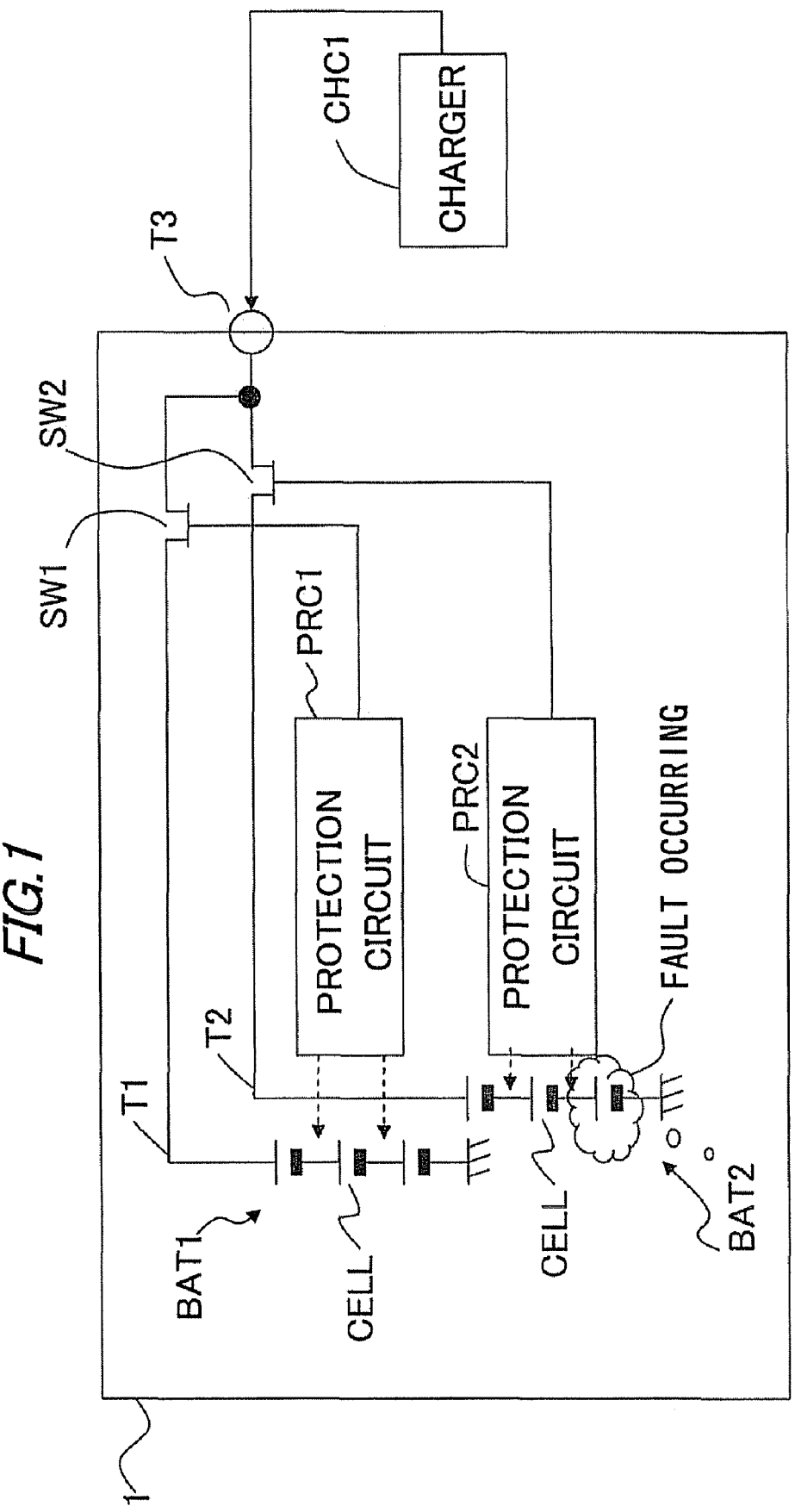
FIG. 1 is an example of a diagram of a battery unit 1.

FIG. 1 illustrates an example of a diagram of the battery unit 1 (which is also referred to as a battery pack). In the battery unit 1, a cell unit BAT1 including battery cells connected in series and a cell unit BAT2 including the battery cells connected in series are connected in parallel. Internal terminals T1, T2 of the cell units BAT1, BAT2 are connected respectively to an external terminal T3 via switching elements SW1, SW2. The respective cell units BAT1, BAT2 are monitored by protection circuits PRC1, PRC2.

For example, the protection circuit PRC1 monitors the battery cells included in the cell unit BAT1 and, when detecting a fault, cuts off the switching element SW1. Herein, the "fault" connotes abnormality in voltage, temperature, etc. within, e.g., the cell unit BAT1. Accordingly, in this case, it follows that electric charge to the cell unit BAT1 via a charging circuit CHC1 is stopped by the cut-off of the switching element SW1. Similarly, the protection circuit PRC2 monitors the respective battery cells included in the cell unit BAT2 and, when detecting the fault, cuts off the switching element SW2. Therefore, in this case, it follows that the electric charge to the cell unit BAT2 via the charging circuit CHC1 is stopped by the cut-off of the switching element SW2.

In the configuration of FIG. 1, however, the cut-off statuses of the switching elements SW1, SW2 are unrecognizable from the charging circuit CHC1. It therefore follows that the charging circuit CHC1 executes charging irrespective of the cut-off statuses of the switching elements SW1, SW2. Such being the case, if operating statuses of the protection circuits PRC1, PRC2 or the cut-off statuses of the switching elements SW1, SW2 can be recognizable from outside of the battery unit 1 and reflected in a charging current of the charging circuit CHC1, the charging control with further-enhanced security can be attained.

The battery unit 1 in the embodiment provides a function of informing the outside of the operating statuses of the protection circuits PRC1, PRC2 which cut off or establish the connections between the internal terminals T1, T2 of the battery cells and the external terminal T3 or the cut-off statuses of the switching elements SW1, SW2. Furthermore, the embodiment will discuss the charging circuit CHC1 which minutely controls the charging current according to the statue of the battery unit 1. Moreover, an electronic device, which minutely controls power consumption on a load side according to the status of the battery unit 1 such as this, will be described.

First Working Example

Figure 2:
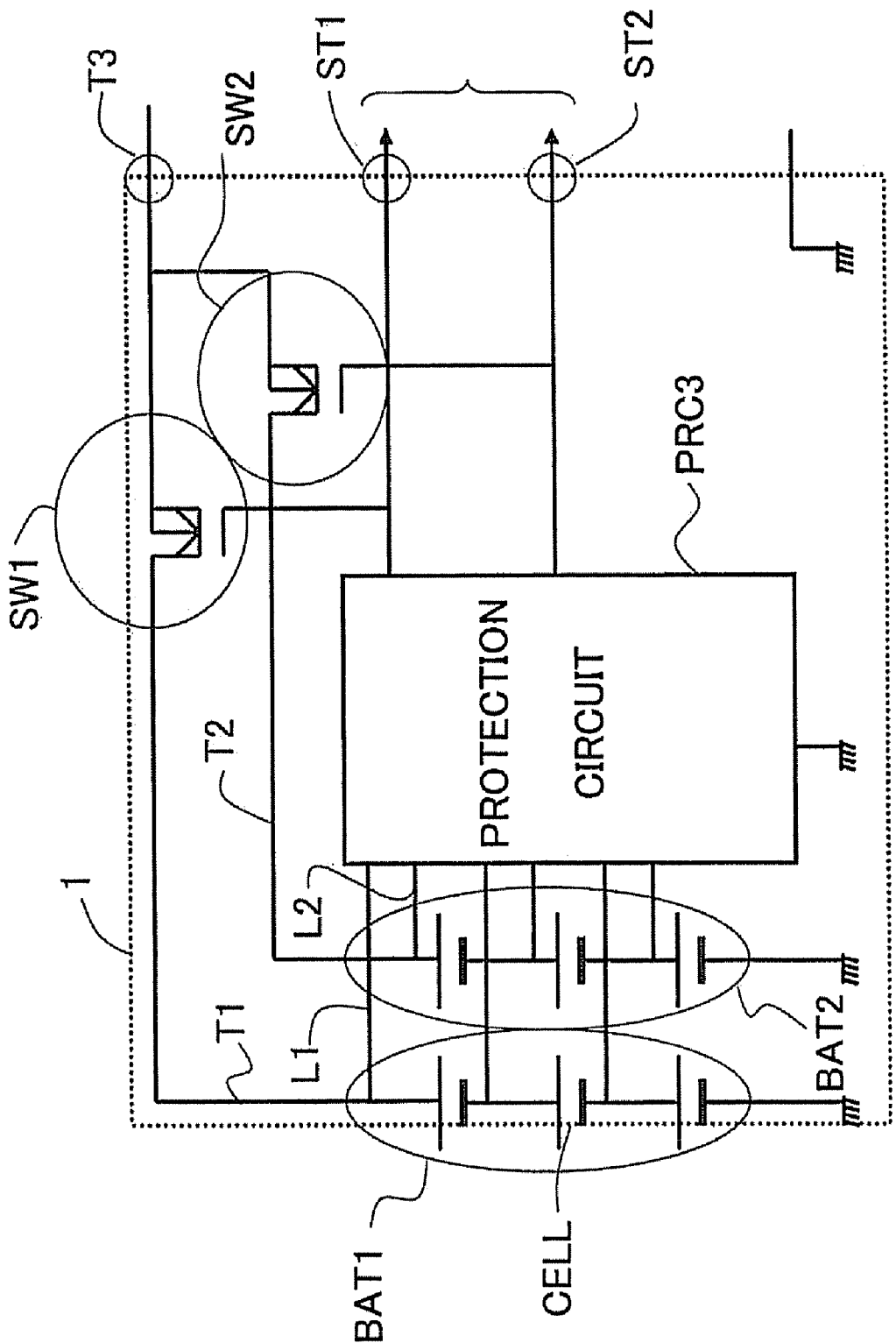
FIG. 2 is a diagram exemplifying a configuration of the battery unit.

FIG. 2 illustrates configurations of the battery unit 1 according to a first working example. In the battery unit 1 in the first working example, as in the case of the battery unit 1 in FIG. 1, the cell unit BAT1 including the battery cells connected in series and the cell unit BAT2 including the battery cells connected in series are connected in parallel. The internal terminals T1, T2 of the cell units BAT1, BAT2 are connected respectively to the external terminal T3 via the switching elements SW1, SW2. The respective cell units BAT1, BAT2 are monitored by a protection circuits PRC3.

The switching elements SW1, SW2 for switching are inserted in a power source line which establishes the connections between the internal terminals T1, T2 of the cell units BAT1, BAT2 and the external terminal T3. If abnormality occurs in each cell, the switching elements SW1, SW2 of the corresponding power source line are cut off. Herein, each of the switching elements SW1, SW2 may include, e.g., a FET (Field Effect Transistor). FIG. 2 exemplifies an NMOS (N-channel Metal Oxide Semiconductor) as the FET, however, a PMOS (P-channel MOS) may also be employed. Herein, the discussion will proceed based on the configuration in FIG. 2.

The protection circuit PRC3 connects connection lines L1, L2 for monitoring to each of the terminals of the battery cells. Accordingly, in the first working example, the protection circuit PRC3 detects terminal voltages of all of the battery cells. Then, the protection circuit PRC3, if the abnormality of the battery cell within the cell unit BAT1 is detected, sets the switching element SW1 in the cut-off status. Further, the protection circuit PRC3, if the abnormality of the battery cell within the cell unit BAT2 is detected, sets the switching element SW2 in the cut-off status.

This type of protection circuit PRC3 may include a combination of a comparator for detecting a low voltage, which detects an abnormal decrease of each battery cell, and a comparator for detecting a high voltage, which detects an abnormal increase of each battery cell. For example, the low-voltage detecting comparator is provided on a one-by-one basis for the output terminal of each battery cell. Then, if an output battery of the corresponding battery cell decreases under a reference value V1, an off-signal (a signal of a LO level) may be output. Similarly, the high-voltage detecting comparator is provided on the one-by-one basis for the output terminal of each battery cell. Then, If the output battery of the corresponding battery cell increases above a reference value V2, the off-signal (the signal of the LO level) may be output.

The comparator may be provided for the individual battery cell, and may also be provided so as to monitor the plurality of battery cells in parallel. For example, a pair of low-voltage detecting comparator and high-voltage detecting comparator may be provided, which monitor the respective terminal voltages of the cell unit BAT1 in parallel. Further, another pair of comparators may be likewise provided for the cell unit BAT2. Thus, when the off signal is output from the comparator which monitors any one of the cell units BAT1 and BAT2, it follows that the corresponding switching element SW1 or SW2 is switched off, and the internal terminal T1 or T2 of the cell unit BAT1 or BAT2 is disconnected from the output T3.

On the other hand, if the output voltage of each battery cell exists between the reference value V1 and the reference value V2, each comparator may output an on-signal (a signal of a HI level). Accordingly, in this case, the internal terminals T1, T2 of the cell units BAT1, BAT2 are connected to the output T3.

Note that the cell voltage may be monitored by use of an A/D converter and a CPU (Central Processing Unit) in place of using the electronic circuit such as the comparator for monitoring the cell voltage described above. In this case, the CPU may execute the same process as by the comparator on the basis of a digital signal value inputted to a port of the CPU via the A/D converter. In this case, the CPU may switch on or off the switching elements SW1, SW2 via a D/A converter.

A characteristic of the battery unit 1 in the first working example lies in such a point that the signals for switching on or off the switching elements SW1, SW2 are output as status signals to the outside from status output terminals ST1, ST2. Accordingly, an external device linking up with the battery unit 1 can grasp the status of the battery unit 1 by monitoring the status output terminals ST1, ST2.

Note that the status signals are output one by one to the cell units BAT1, BAT2 in FIG. 2, however, the outside may also be notified of the cut-off status of the switch by use of a plurality of voltage levels in a way that organizes these status signals into the plurality of voltage levels in one signal line. Further, for instance, an available scheme is to give notification about which line is disconnected in the way of using a communication means such as a serial bus like I2C (Inter-Integrated Circuit) etc. In this case, interfaces are connected to both terminals of the bus, whereby the communications may be performed between the interior and the exterior of the battery unit. Thus, the embodiment may take whatever means for notifying of the cut-off statuses of the switches SW1, SW2.

Furthermore, FIG. 2 exemplifies the cell units BAT1 and BAT2, however, the number of parallel circuits of the cell units is not limited to "2".

Thus, the external device (which will hereinafter be referred to as a body side) receiving the cut-off notifying signal can know a decrease in the number of the parallel circuits of the cell units BAT1, BAT2, etc. of the battery. Accordingly, for example, the charging circuit for charging the battery unit 1 with electricity controls the charging current based on the status signal when charging. Namely, in a status where the number of the parallel circuits of the cell units BAT1, BAT2, etc. of the battery decreases, the charge is conducted by setting the charging current value to ½ as small as a normal value, thereby enabling the charge to be done in safety without any load of an over-current on each cell within the battery unit.

Moreover, a load circuit supplied with the electric power from the battery unit 1 may control, based on the status signal, the power consumption in a discharging status or when discharging. Namely, when discharging, a discharging load to the battery unit is reduced by decreasing the load in a power saving mode on the system side, whereby the battery unit 1 can be used in a much safer state. The power saving mode can be exemplified such as restraining a CLOCK speed and applying a restriction to the device for use. In this way, the safety can be enhanced without stopping the charge. Further, in addition to the control such as this, the charging current may be stopped, or alternatively the discharging current may be restricted within the battery unit 1 under the conventional control.

Figure 3:
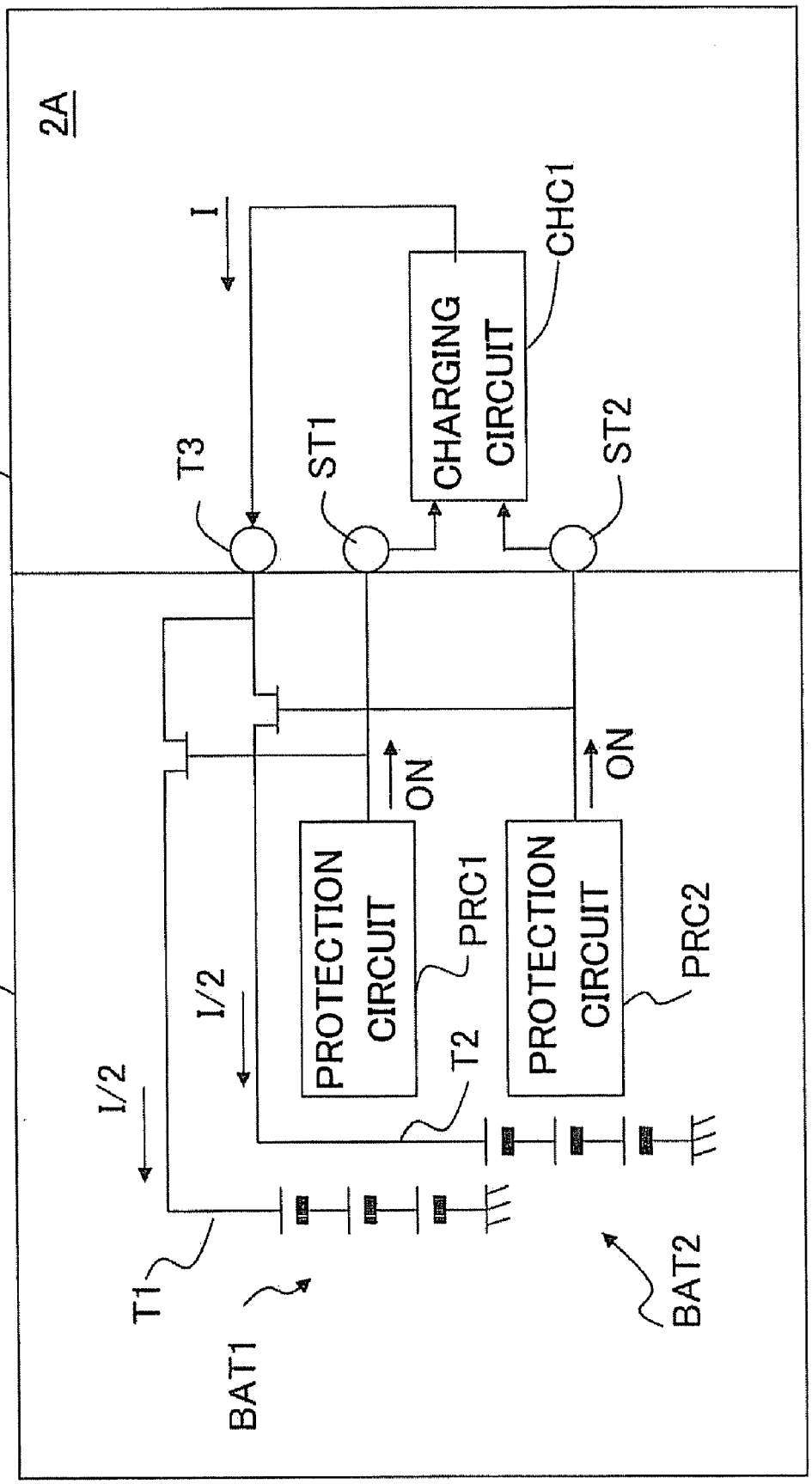
FIG. 3 is an explanatory diagram of a processing example (part 1) when a charging circuit charges the battery unit with electricity.
Figure 4:
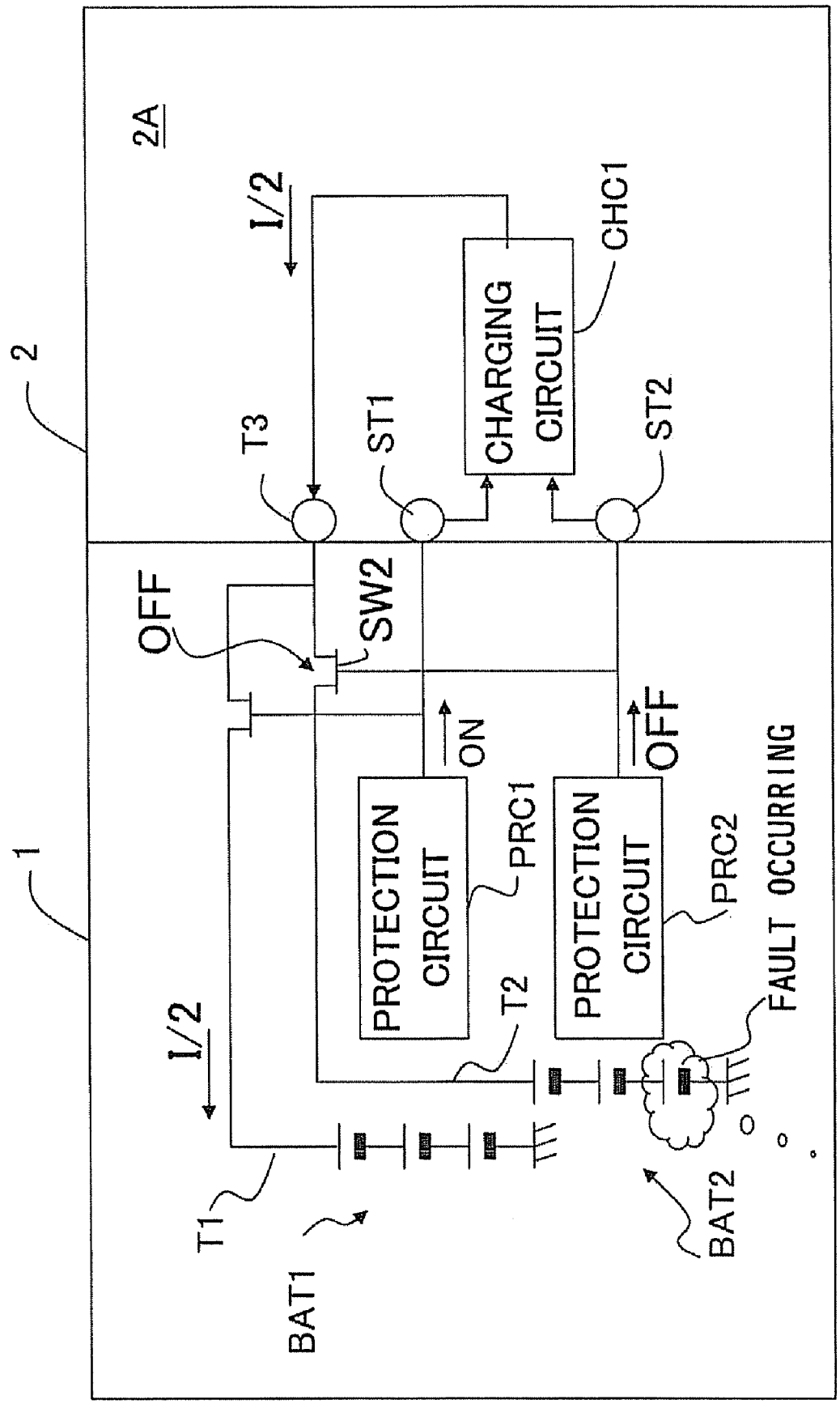
FIG. 4 is an explanatory diagram of the processing example (part 2) when the charging circuit charges the battery unit with the electricity.

FIGS. 3 and 4 are explanatory diagrams of a processing example when the charging circuit CHC1 within the external device 2A charges the battery unit 1 with the electricity. FIG. 3 illustrates a distribution of the charging current in a status without any fault. Herein, let I be the charging current in the normal status. In this case, it is assumed that the charging current is shunted and thus supplied to the cell units BAT1, BAT2. Hence, the cell units BAT1, BAT2 are each normally charged with the electricity at the current value I/2. Note that a configuration including the charging circuit CHC1 and a connecting unit with the battery unit 1 is called a charger 2 in the embodiment.

FIG. 4 illustrates an example of the current distribution in a case where the fault occurs in the battery unit 1. Now, such a case is considered that the fault occurs in any one of the batteries of the cell unit BAT2. In this case, the protection circuit PRC2 of the cell unit BAT2 outputs a cell fault signal (OFF signal). Accordingly, the charging circuit CHC1 is notified of the fault of the cell unit BAT2, and the switch SW2 is cut off. As a result, the internal terminal T2 of the cell unit BAT2 is disconnected from the external terminal T3, and that the power source line is cut off.

The power source line of the cell unit BAT2 is cut off, and it therefore follows that the current I flows from the charging circuit CHC1 to the power source line of the cell unit BAT2. This current contains a proportion of the current that should be originally supplied to the cell unit BAT2. Then, the charging circuit CHC1 receiving the fault notification reduces the charging current down to I/2 and charges the cell unit BAT1 with the proper charging current.

Figure 5:
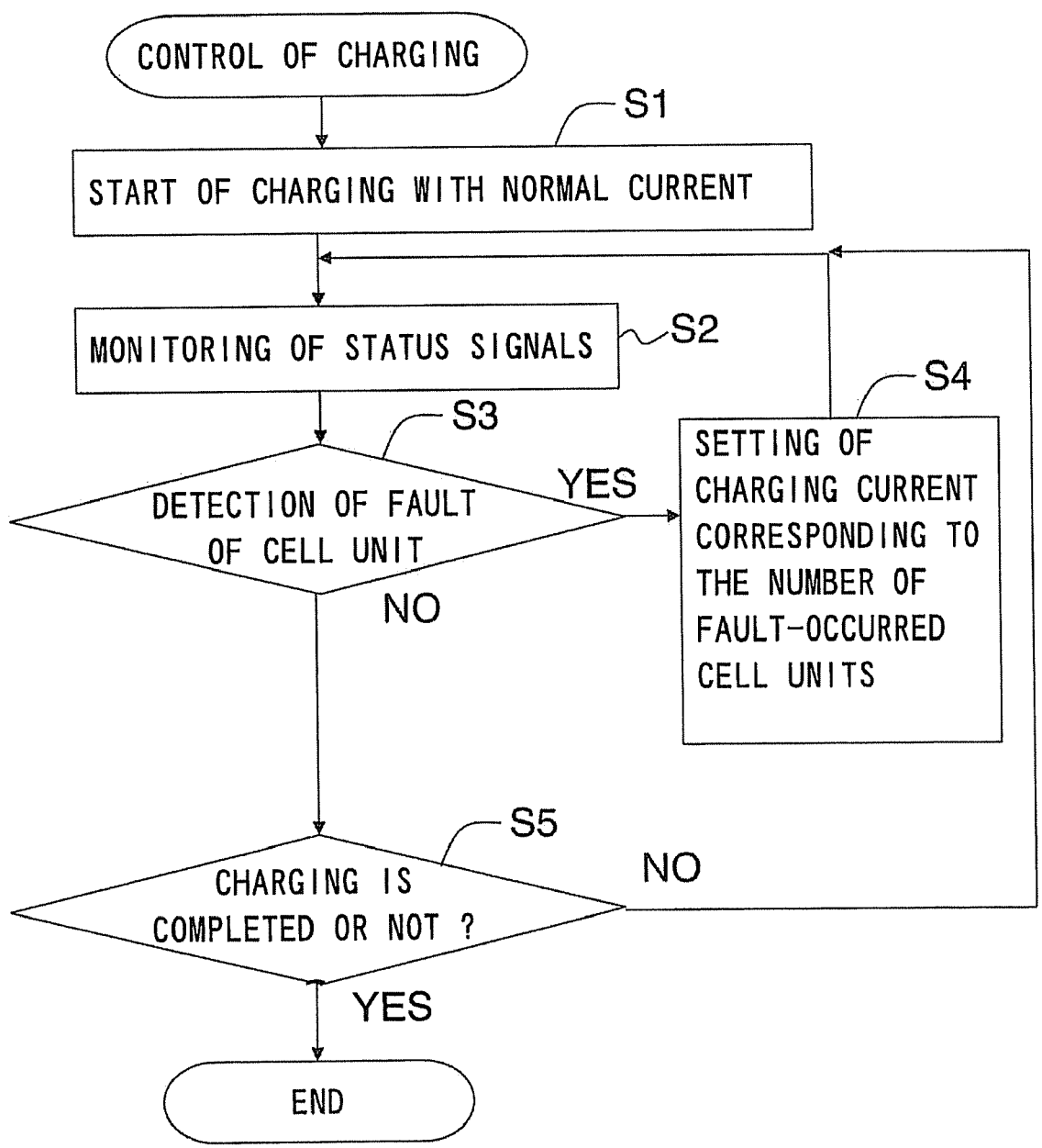
FIG. 5 is a diagram exemplifying a control sequence of a charging circuit.

FIG. 5 exemplifies a control sequence of the charging circuit CHC1 in this case. The control sequence is realized in such a way that the CPU controlling the charging circuit CHC1 executes a control program. This control sequence may also be, however, realized by a circuit that generates the charging current value from signals 11, 10, 01 and 00, simply corresponding the ON (1) status and the OFF (0) status of the status output terminals ST1, ST2.

In this process, the charging circuit CHC1, at first, starts charging with the normal current (e.g., the current value I) (S1). Then, the charging circuit CHC1 monitors the status signals of the status output terminals ST1, ST2 (S2). Subsequently, it is determined from the status output terminals ST1, ST2 which cell unit, BAT1 or BAT2, has the occurrence of the fault (S3).

If the fault occurs in any one of the cell units BAT1, BAT2, the charging circuit CHC1 sets the charging current corresponding to the number of fault-occurred cell units (S4). In this case, for instance, if m-pieces of cell units in totally N-pieces of cell units get into the fault, it is sufficient that the charging current is set such as 1×(N−m)/N. Then, the charging circuit CHC1 loops the control back to S2. It is noted, the process in S4 may also be executed only when the number of new malfunctioning units rises.

Whereas if none of the fault is detected, the charging circuit CHC1 determines whether the charge is completed or not (S5). It may be determined from, e.g., the battery voltage at the external terminal T3 whether the charge is completed or not. An internal charging status may, however, be acquired from the battery unit 1 via a communication means such as an I2L circuit. Then, if the charge is not completed, the charging circuit CHC1 loops the control back to S2. Further, whereas if the charge is completed, the battery unit finishes the charging control.

Figure 6:
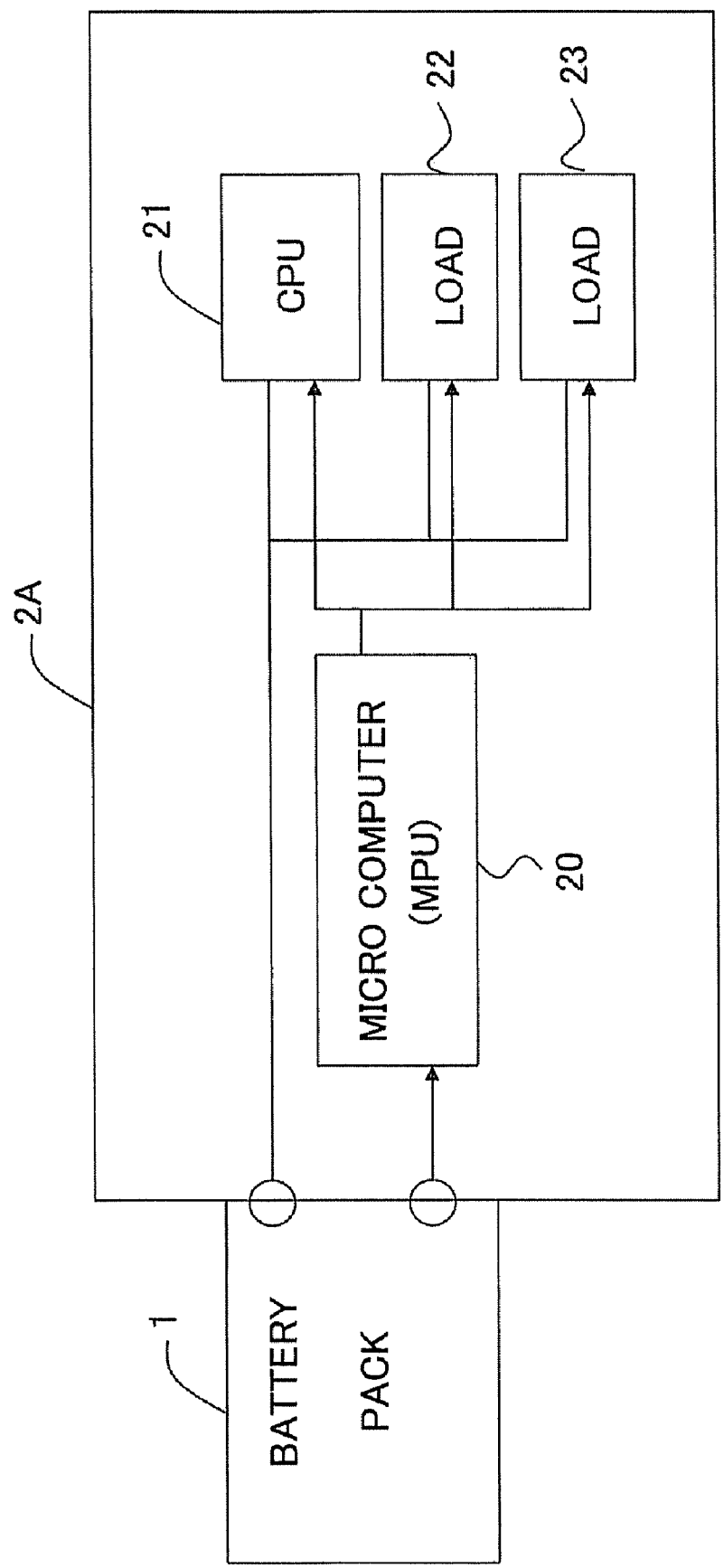
FIG. 6 is an explanatory diagram of a processing example of how an external device controls power consumption.

FIG. 6 is an explanatory diagram of a processing example in which the external device 2A supplied with the power from the battery unit 1 controls the power consumption. Normally, the cell units BAT1, BAT2 divide the current I to the load by 2 and thus discharges the electricity, and therefore respectively the current of I/2 is discharged.

For example, as in FIG. 4, such a case is considered that the fault occurs in any one of the battery cells of the cell unit BAT2. In this case, similarly to the case in FIG. 4, the protection circuit of the cell unit BAT2 outputs the cell fault signal.

Then, the charging circuit is notified of the fault, and the power source line of the cell unit BAT2 is cut off. The cut-off of the power source line of the cell unit BAT2 leads to a flow of the current I to the power source line of the cell unit BAT1.

Then, a microcomputer (which will hereinafter be simply referred to as an MPU 20) receiving the fault notification notifies the load of a load reducing request in order to decrease the discharging current. In response to this load reducing request, for instance, a CPU 21 of the external device transitions to a low power consumption mode. The low power consumption mode is defined as a mode for reducing a clock count of the CPU 21. For example, it may be sufficient that the MPU 20 issues an instruction of setting the clock count to a ½-fold value to the CPU 21. Moreover, e.g., a power consumption reducing request is issued to loads 22, 23. For example, this is an instruction of, if the load 22 includes USB interfaces, cutting off the USB interface that is not in a busy status. Furthermore, e.g., this is a setting process of reducing a lighting continuous period of a backlight of a liquid crystal display etc., and extinguishing the light in a shorter period of time than the normal lighting period.

If the processes described above enable the load circuit including the CPU 21 and the loads 22, 23 to reduce the current down to I/2, the discharging current of the cell unit BAT1 becomes I/2. Further, even if the load circuit does not reduce the current down to I/2, the discharging current of the cell unit BAT1 is restrained by suppressing the current, whereby the safety can be enhanced.

Figure 7:
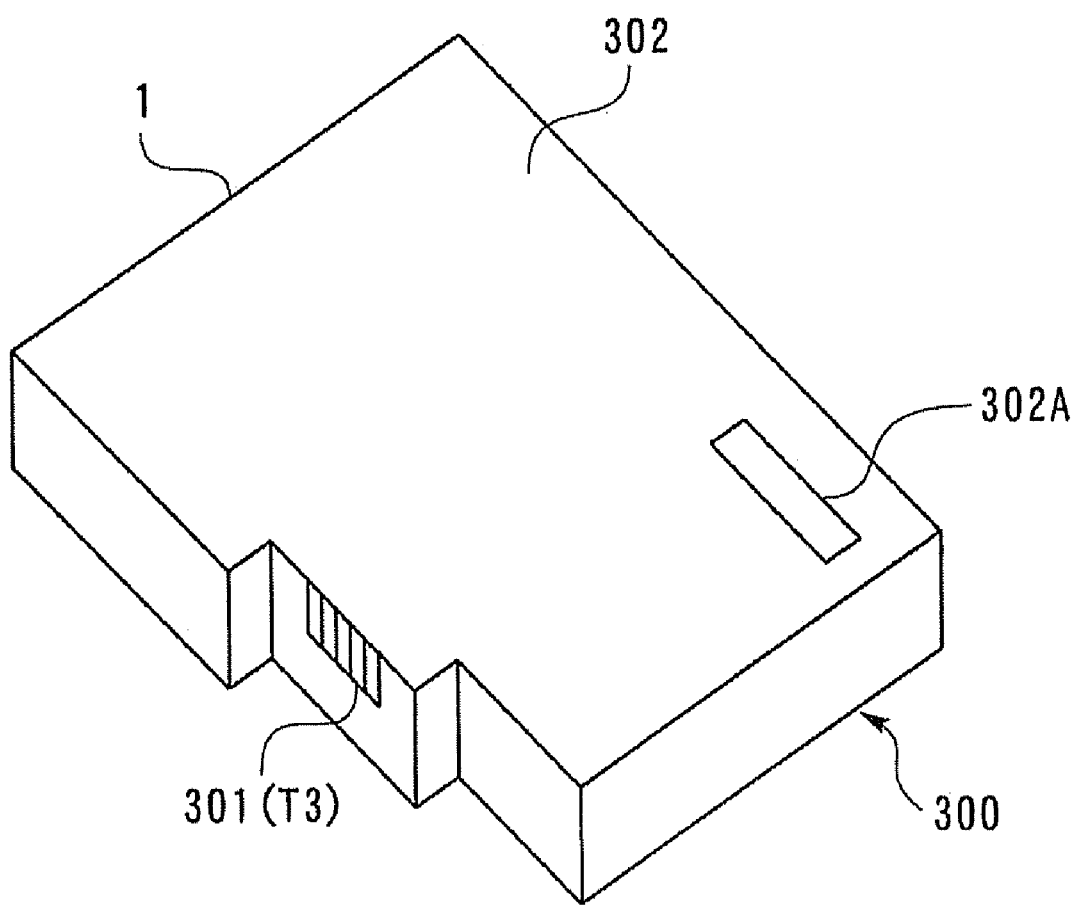
FIG. 7 is a perspective view exemplifying an external appearance of the battery unit.

FIG. 7 is a perspective view illustrating an external appearance of the battery unit 1. The battery unit 1 includes a housing 300 that houses the battery cells, control circuits peripheral to the battery cells, etc., a cover 302 constituting an upper surface wall of the housing 300, a window portion 302A formed in the cover 302, and a terminal portion 301 exposed from a side wall of the housing 300. Note that the terminal portion 301 includes the external terminal T3 depicted in FIGS. 1 and 2.

Figure 8:
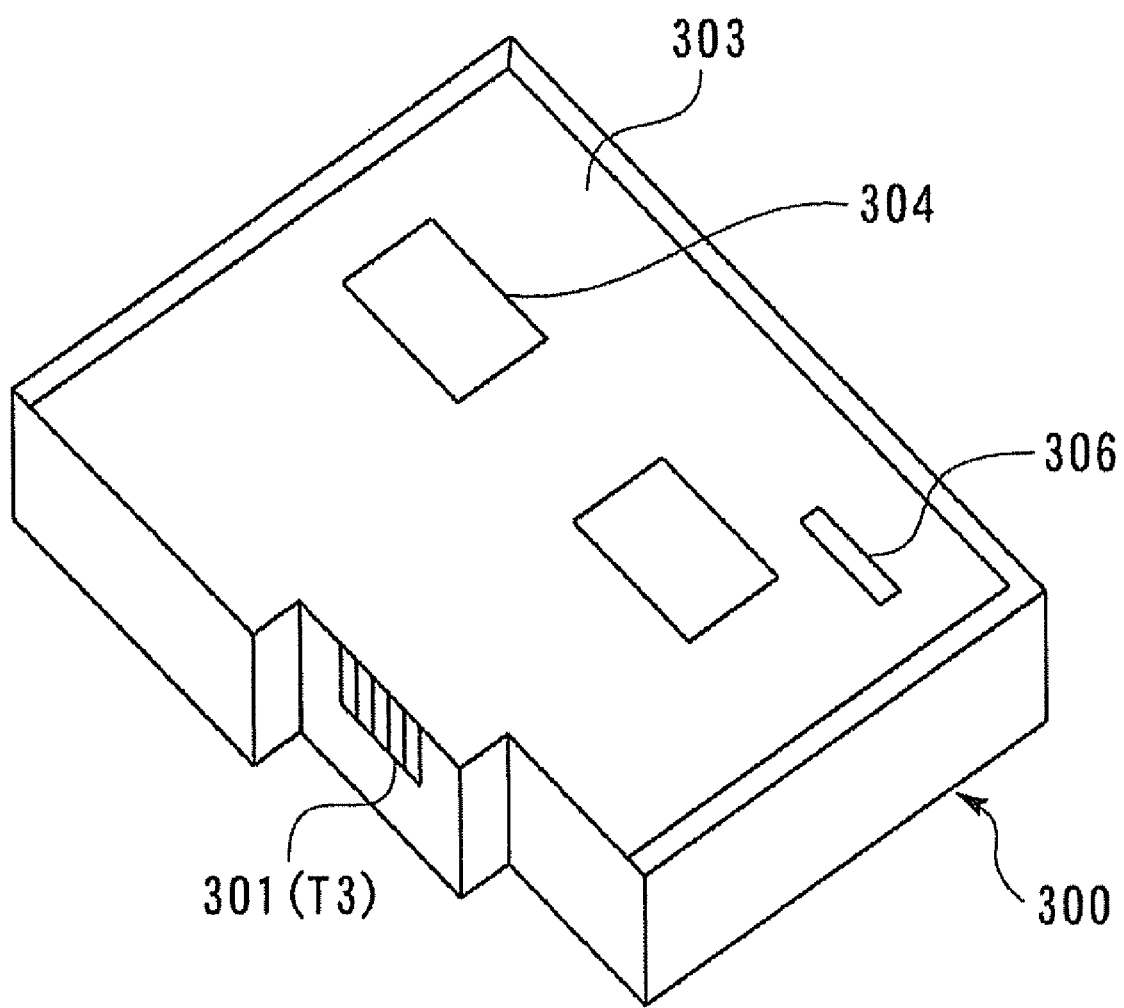
FIG. 8 is a perspective view depicting the battery unit in a state where a cover is removed.

FIG. 8 is a perspective view illustrating the battery unit in a state where the cover 302 in FIG. 7 is removed. When removing the cover, a substrate 303 within the battery unit 1 is exposed. The substrate 303 is mounted with a control IC chip 304 for controlling the whole of the battery unit 1, a fuse 306, etc. An internal portion of the IC chip 304 includes the protection circuits PRC1, PRC2, the switching elements SW1, SW2, etc., which are illustrated in FIGS. 1 and 2.

Figure 9:
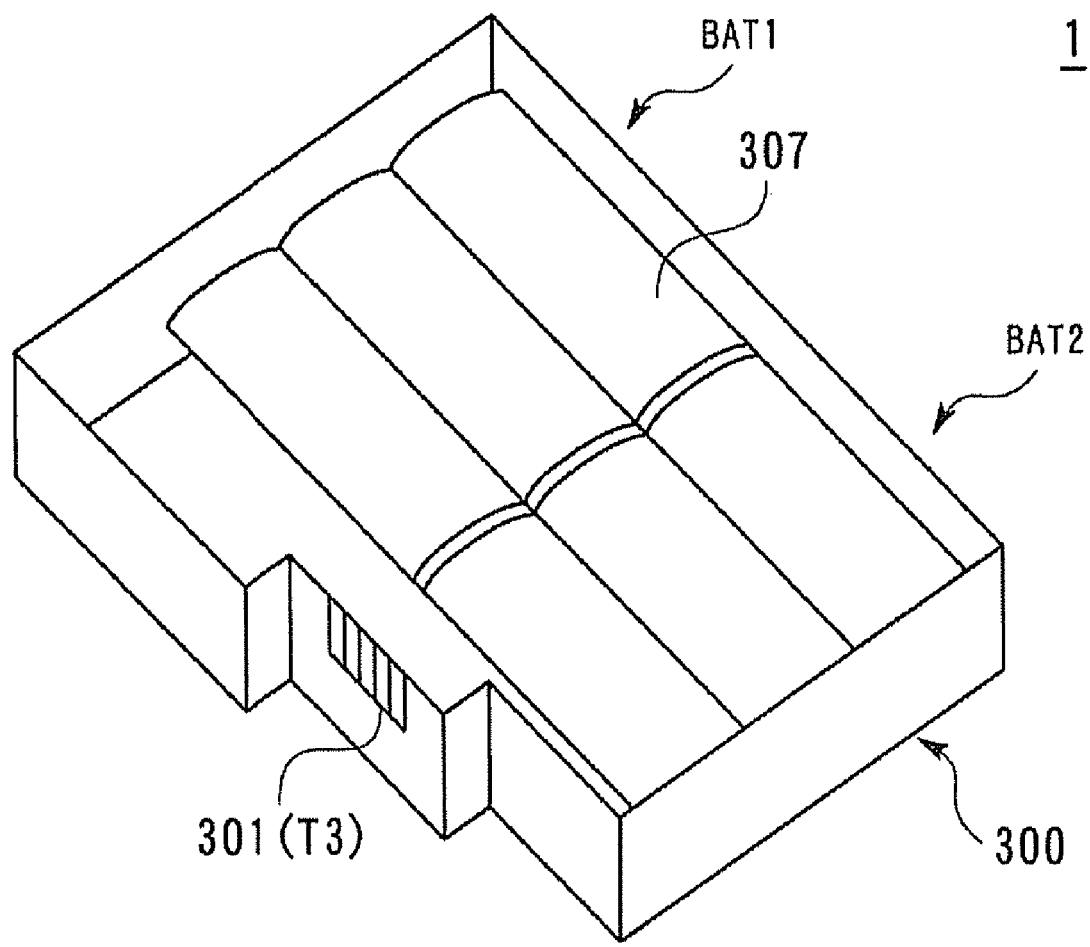
FIG. 9 is a perspective view depicting the battery unit 1 in a state where a substrate is removed.

FIG. 9 is a perspective view depicting the battery unit 1 in a state where the substrate 303 in FIG. 8 is removed. When removing the substrate 303, a battery cell 307 is exposed. The battery cell 307 is included in each of, e.g., the cell units BAT1, BAT2. In FIG. 9, each of the cell units BAT1, BAT2 includes three pieces of battery cells 307 connected in series.

The configurations in FIGS. 7 through 9 are exemplifications, and the external configurations of the battery unit 1 in the first working example are not limited to these configurations in FIGS. 7 through 9. For example, the cell units are not restricted to the two cell units BAT1, BAT2, but three or more pieces of cell units may be arranged in parallel. Moreover, the number of the battery cells within one cell unit is not limited to "3", but each of the cell units BAT1, BAT2, etc. may include the single battery cell or the two battery cells. Furthermore, each of the cell units BAT1, BAT2, etc. may also include four or more pieces of battery cells connected in series.

As discussed above, according to the battery unit 1 in the first working example, the external device is notified of the state of whether the cell units BAT1, BAT2, etc. within the battery get into the fault or not through the status output terminals ST1, ST2, etc. Accordingly, the charging circuit, which charges the battery unit 1 with the electricity, may restrict the charging current to a greater degree than normal, corresponding to the number of the malfunctioning cell units BAT1, BAT2, etc. Furthermore, the external device supplied with the power from the battery unit 1 may transitions to, e.g., the low power consumption mode for reducing the power consumption in the external device under the control of the CPU 21 etc. depicted in FIG. 6.

Second Working Example

Figure 10:
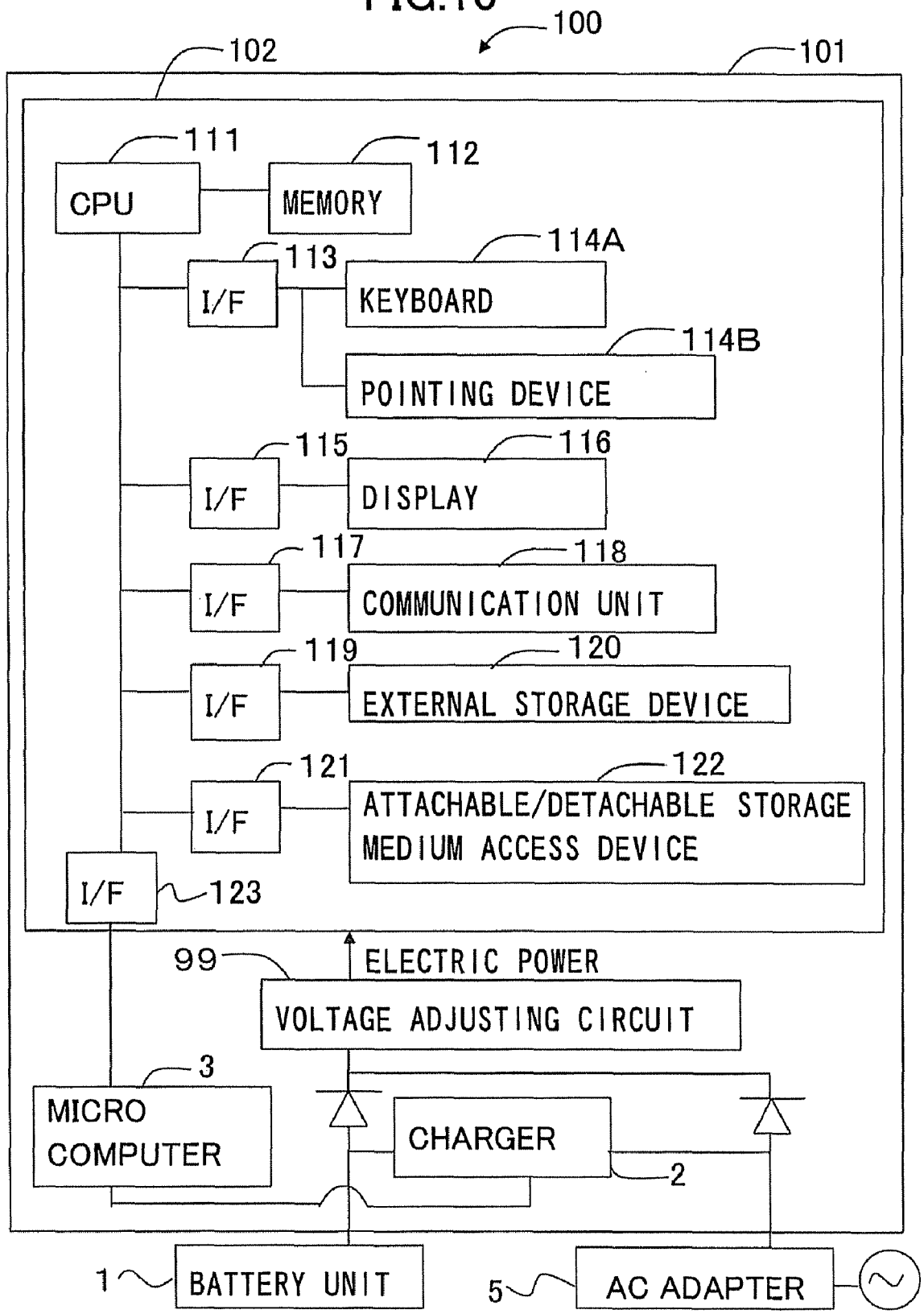
FIG. 10 is a diagram exemplifying a configuration of an electronic device.

An electronic device according to a second working example will hereinafter be described with reference to FIG. 10. FIG. 10 illustrates a configuration of an electronic device 100 incorporating the same battery unit 1 as in the first working example. The electronic device 100 includes a body unit 101, the battery unit 1 and an AC adaptor 5. The AC adaptor 5 converts inputted AC power into DC power and thus outputs the DC power. The body unit 101 includes a processing unit 102, a microcomputer 3, a charger 2 and a voltage adjusting circuit 99. The processing unit 102 includes a CPU 111 which executes a program, a memory 112 stored with the program executed by the CPU 111 or data processed by the CPU 111, and a keyboard 114A and a pointing device 114B that are connected to the CPU 111 via an interface 113. The pointing device 114B is exemplified such as a mouse, a trackball, a touch panel and a flat device having an electrostatic sensor.

Moreover, the body unit 101 has a display 116 connected via an interface 115. The display 116 displays information inputted from the keyboard 114A or the data processed by the CPU 111. The display 116 is exemplified by a liquid crystal display and an EL (electroluminescence) panel. Further, the body unit 101 includes a communication unit 118 connected via an interface 117. The communication unit 118 is exemplified by a LAN (Local Area Network) board, etc. Furthermore, the body unit 101 has an external storage device 120 connected via an interface 119. The external storage device 120 is, e.g., a hard disk drive. Moreover, the body unit 101 includes an attachable/detachable storage medium access device 22 connected via an interface 121. An attachable/detachable storage medium is exemplified such as a CD (Compact Disc), a DVD (Digital Versatile Disk) and a flash memory card.

The processing unit 102 is connected via the voltage adjusting circuit 99 (corresponding to a power source circuit) to any one of the AC adaptor 5 and the battery unit 1 through a face-to-face arrangement of diodes (or elements (such as FETs) in place of the diodes), and the power is thus supplied. The face-to-face arrangement of diodes may be described as a pair of diodes which are connected cathode to cathode, or anode to anode. This type of electronic device 100 can be exemplified by a notebook type (which is also called a book type and a laptop type) personal computer, an information processing device such as a mobile information terminal (PDA: Personal Digital Assistant), a video device such as a digital camera and a video camera, a communication device such as a mobile phone and a PHS (Personal Handy-phone System), a receiver of an analog or digital TV system, an on-vehicle device and a measuring instrument mounted with a sensor.

The processing unit 102 is supplied with the power from the battery unit 1 via the voltage adjusting circuit 99 of the body unit 101.

The body unit 101 has the built-in charger 2 and the built-in microcomputer 3, and the battery unit 1 is charged with the electricity on the basis of the power from the AC adaptor 5. Processes of the charger 2 and the microcomputer 3 are the same as those in the first working example. With these configurations, it is feasible to properly execute the stable power supply to the electronic device 100 or the processing unit 102 and also execute the charging control and the discharging control when the fault occurs in the battery unit 1. Further, the microcomputer 3 notifies the CPU 111 of the status of the battery unit 1 via an interface 123. The CPU 111 executes the power consumption control process corresponding to the status of the battery unit 1, of which the microcomputer 3 has notified.

Note that the microcomputer 3 is provided outwardly of the battery unit 1 in FIG. 10, thus detecting the status of the charger 2. As a substitute for this configuration, however, the microcomputer 3 may be provided within the battery unit 1. FIG. 11 illustrates an example in which a microcomputer 3A is provided within a battery unit 1A. In this example, the microcomputer 3A (corresponding to a control unit) monitors the voltage of each of units within the battery unit 1A. Then, if the fault is detected, the microcomputer 3 within the body unit 101 is notified of this purport via an interface 124. The interface 124 is, e.g., the I2C interface.

The microcomputer 3 within the body unit 101 executes the control process of the charger 2 with respect to the notification given from the microcomputer 3A within the battery unit 1A. Further, the microcomputer 3A within the battery unit 1A notifies the CPU 111 of the status of the battery unit 1A through the microcomputer 3. The microcomputer 3A within the battery unit 1A may, however, directly notify the CPU 111 of the status of the battery unit 1A via the interface 123 without through the microcomputer 3. With this configuration also, the CPU 111 can execute the power consumption control process corresponding to the status of the battery unit 1, of which the microcomputer 3 or the microcomputer 3A has notified.

According to the present battery unit 1, the external device 2A is informed of the operating status of the protection circuit via the informing signal output terminal. Accordingly, the external device 2A can identify the internal status of the battery unit 1 from the informing signal output terminal, and can execute the control corresponding to this status.

According to the present battery unit 1, it is possible to further enhance the safety of the battery unit 1 by minutely restricting the current when charging and discharging, corresponding to the internal status of the battery unit 1.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A battery unit comprising:
    a battery including a plurality of cell units connected in parallel, in which one or a plurality of battery cells is connected in series;
    an external terminal provided for the battery;
    a plurality of switching elements provided between each of the plurality of cell units and the external terminal;
    a protection circuit to monitor whether a fault occurs in each of the plurality of cell units and to cut off, through one of the plurality of switching elements, a connection between the external terminal and the cell unit in which the fault is detected; and
    a plurality of informing signal output terminals, each of which corresponds to one of the plurality of switching elements, and outputs to an external device a signal to inform a status of the corresponding switching element.

2. The battery unit according to claim 1, wherein the informing signal output terminals are provided corresponding to the number of the switching elements and respectively output status signals representing cut-off statuses and connecting statuses of the respective switching elements.

3. The battery unit according to claim 1, comprising a control unit to inform the external device of the cut-off status and the connecting status of each switching element via an informing signal output terminal.

4. A battery system including a battery unit and a charging circuit charging the battery unit with electricity,
    the battery unit comprising:
        a battery including a plurality of cell units connected in parallel, in which one or a plurality of battery cells is connected in series;
        an external terminal provided for the battery;
        a plurality of switching elements provided between each of the plurality of cell units and the external terminal;
        a protection circuit to monitor whether a fault occurs in each of the plurality of cell units and to cut off, through one of the plurality of switching elements, a connection between the external terminal and the cell unit in which the fault is detected; and
        a plurality of informing signal output terminals, each of which corresponds to one of the plurality of switching elements, and outputs to an external device a signal to inform a status of the corresponding switching element.

5. The battery system according to claim 4, wherein the charging circuit includes a charging control circuit to restrain, when an informing signal output to an informing signal output terminal informs of a cut-off of any one or more of the cell units, a charging current with which the battery unit is charged, corresponding to a number of the cut-off cell units.

6. An electronic device including a battery unit and a load circuit supplied with electric power from the battery unit, the battery unit comprising:
    a battery including a plurality of cell units connected in parallel, in which one or a plurality of battery cells is connected in series;
    an external terminal provided for the battery;
    a plurality of switching elements provided between an internal terminal of each of the plurality of cell units and the external terminal;
    a protection circuit to monitor whether a fault occurs in each of the plurality of cell units and to cut off, through one of the plurality of switching elements, a connection between the external terminal and the cell unit in which the fault is detected; and
    a plurality of informing signal output terminals, each of which corresponds to one of the plurality of switching elements, and outputs to an external device a signal to inform a status of the corresponding switching element.

7. The electronic device according to claim 6, wherein the load circuit includes a load control unit to restrain, when an informing signal output to an informing signal output terminal informs of a cut-off of any one or more of the cell units, consumption of the power from the battery unit, corresponding to a number of the cut-off cell units.

8. The electronic device according to claim 6, comprising an alarm unit outputting, when an informing signal output to an informing signal output terminal informs of the cut-off of any one or more of the cell units, an alarm to a user according to the informing signal.

9. A charging control method of a battery comprising:
    a battery including cell units connected in parallel, in which one or a plurality of battery cells is connected in series;
    an external terminal provided for the battery;
    a plurality of switching elements provided between each of the plurality of battery cell units and the external terminal;
    a protection circuit to monitor whether a fault occurs in each of the plurality of cell units and to cut off, through one of the plurality of switching elements, a connection between the external terminal and the cell unit in which the fault is detected; and
    a plurality of informing signal output terminals, each of which corresponds to one of the plurality of switching elements, and outputs to an external device a signal to inform a status of the corresponding switching element,
    the method comprising:
        monitoring an informing signal output terminal; and
        restraining, when an informing signal output to the informing signal output terminal informs of a cut-off of any one or more of the cell units, a charging current with which the battery unit is charged, corresponding to the number of the cut-off cell units.

10. A discharging control method of a battery comprising:

a battery including cell units connected in parallel, in which one or a plurality of battery cells is connected in series;

an external terminal provided for the battery;

a plurality of switching elements provided between each of the plurality of cell units and the external terminal;

a protection circuit to monitor whether a fault occurs in each of the plurality of cell units and to cut off, through one of the plurality of switching elements, a connection between the external terminal and the cell unit in which the fault is detected; and a plurality of informing signal output terminals, each of which corresponds to one of the plurality of switching elements, and outputs to an external device a signal to inform a status of the corresponding switching element, the method comprising:

monitoring an informing signal output terminal; and restraining, when an informing signal output to the informing signal output terminal informs of a cut-off of any one or more of the cell units, consumption of the power from the battery unit, corresponding to the number of the cut-off cell units.

11. The discharging control method of a battery according to claim 10, comprising outputting, when the informing signal output to the informing signal output terminal informs of the cut-off of any one or more of the cell units, an alarm to a user according to the informing signal.

* * * * *

UNITED STATES PATENT AND TRADEMARK OFFICE
CERTIFICATE OF CORRECTION

PATENT NO. : 8,405,357 B2
APPLICATION NO. : 12/510466
DATED : March 26, 2013
INVENTOR(S) : Mitsuo Saeki et al.

Page 1 of 1

It is certified that error appears in the above-identified patent and that said Letters Patent is hereby corrected as shown below:

In the Claims:

Column 10, Line 21-22, In Claim 6, after "between" delete "an internal terminal of".

Signed and Sealed this
Seventeenth Day of December, 2013

Margaret A. Focarino
*Commissioner for Patents of the United States Patent and Trademark Office*